United States Patent [19]
Choi

[11] Patent Number: 5,321,551
[45] Date of Patent: Jun. 14, 1994

[54] PROJECTION LENS APPARATUS FOR REAR PROJECTION TELEVISION

[75] Inventor: Soon Cheol Choi, Suwon-city, Rep. of Korea

[73] Assignee: Samsung Electronic Co., Ltd., Kyungki-do, Rep. of Korea

[21] Appl. No.: 23,392

[22] Filed: Feb. 26, 1993

[30] Foreign Application Priority Data

Feb. 29, 1992 [KR] Rep. of Korea .................. 92-3347

[51] Int. Cl.⁵ .................. G02B 9/60; G02B 13/18; G02B 15; G02B 14
[52] U.S. Cl. .................. 359/649; 359/714; 359/770; 359/654; 359/746; 359/695
[58] Field of Search .............. 359/649, 714, 770, 652, 359/653, 654, 655, 746, 677, 695

[56] References Cited

U.S. PATENT DOCUMENTS

| | | | |
|---|---|---|---|
| 4,859,040 | 8/1989 | Kitagishi et al. | 359/652 |
| 4,924,244 | 5/1990 | Kataoka et al. | 359/649 |
| 5,048,940 | 9/1991 | Ueda et al. | 359/649 |

FOREIGN PATENT DOCUMENTS

0190811  7/1990  Japan .................. 359/649

Primary Examiner—Loha Ben
Assistant Examiner—Evelyn A. Lester
Attorney, Agent, or Firm—Sughrue, Mion, Zinn, Macpeak & Seas

[57] ABSTRACT

A projection lens apparatus for a rear projection television. The projection lens apparatus includes a first lens in which the negative power of the lens gradually increases from the central portion of the lens, having almost no power, to the peripheral portion, a second lens having a strong positive power, a third lens in which the positive power of the lens gradually increases from the central portion, having almost no power, to the peripheral portion, a fourth lens having a positive power at the central portion and a negative power at the peripheral portion and a fifth lens having a strong negative power, wherein the first to fifth lenses are sequentially arranged along an optical axis toward a cathode ray tube from a screen. The various lenses perform different functions. Accordingly, the projection distance and the size of the lens are reduced, thereby reducing the size of the system. Also, the various aberrations generated through the projection lenses are effectively corrected, to thereby improve performance of the image formation and the peripheral light quantity.

12 Claims, 2 Drawing Sheets

FIG. 1
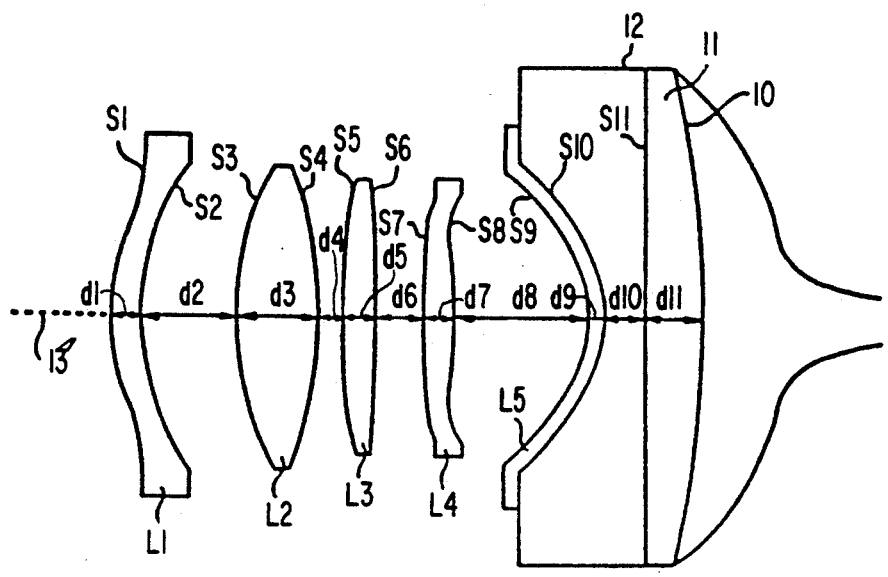
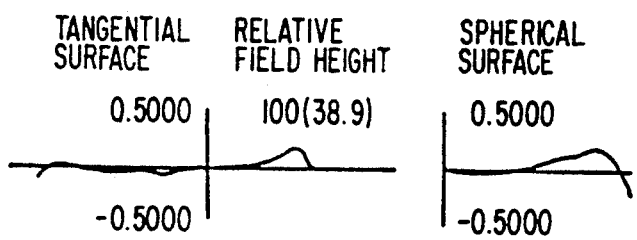
FIG. 2A
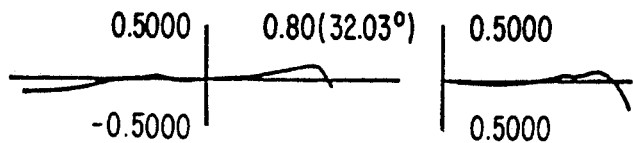
FIG. 2B
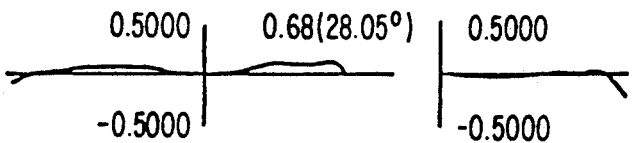
FIG. 2C
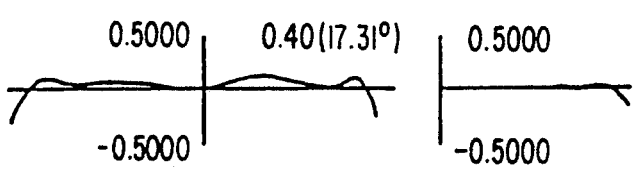
FIG. 2D
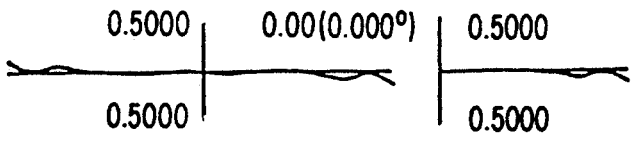
FIG. 2E

PROJECTION LENS APPARATUS FOR REAR PROJECTION TELEVISION

BACKGROUND OF THE INVENTION

1. Field of the Invention

The present invention relates to a projection lens apparatus for a rear projection television.

2. Background

Generally, a projection television enlarges and projects on a screen three picture images of red (R), green (G) and blue (B) emitted from a cathode ray tube (CRT) through three projection lenses. There are two different techniques for projecting an image on a screen. According to a first such technique known as a front projection technique, the picture images are projected on the front surface of the screen and are reflected therefrom so that the images can be watched by a user. According to a second technique known as a rear projection technique, the picture images are projected on the rear surface of the screen and are transmitted therethrough so that the images can be watched by the user. In this latter technique, since the lights entering the screen from the surroundings are not reflected from the screen, but rather, are transmitted through the screen, the user can easily watch the picture images even in bright indoor places.

Such a rear projection television can be generally varied in regard to the size of the system and the capability of forming the image with the projection lens. The projection lens for the rear projection television requires a short projection distance (i.e., the distance between the projection lens and the screen to reduce the size of the projection system), a small F-number to form a bright image on the screen, and an excellent image formation capability to produce an excellent image.

Accordingly, to satisfy the above requirements, a number of the projection lenses have been developed. However, in such conventional projection lenses, a variety of the problems have been encountered. First, since the existing projection lens groups are comprised of three lenses for three groups, correction of aberration is limited. Accordingly, the image formation capability is limited. Also, since the projection distance is relatively long and the size of the lens is large, the size of the system cannot be reduced. Further, the ratio of the amount of light formed on the peripheral portion of the screen with respect to the amount of light formed on the central portion of the screen is not more than 30%. Therefore, the peripheral image is darker than the central image.

Also, degradation of the performance of the plastic lens, which is generally used as the projection lens, due to the peripheral temperature variation is not properly corrected. Furthermore, to correct chromatic aberration of the R, G and B lights, the distance of the projection lens from the CRT is primarily adjusted. However, such a correction is limited, thereby dimming the peripheral image on the screen. Still further, the distortion aberration in which a rectangular screen surface is distorted on the screen which is formed by the lights enlarged and projected through the projection lens, can be corrected by means of a convergence means within the CRT. However, the larger the aberration, the greater the cost associated with correcting this aberration.

SUMMARY OF THE INVENTION

Therefore, to solve the above problems, it is an object of the present invention to provide a projection lens apparatus for use in a rear projection television in which the projection distance and the size of the lens are reduced, so as to reduce the size of the projection system, and in which the image forming capability and the peripheral light quantity are improved.

To accomplish the above object of the present invention, there is provided a projection lens apparatus for a rear projection television, the projection lens apparatus comprising:

a first lens in which the negative power of the lens gradually increases from the central portion of the lens, having substantially no power, to the peripheral portion;

a second lens having a strong positive power;

a third lens in which the positive power of the lens gradually increases from the central portion, having substantially no power, to the peripheral portion;

a fourth lens having a positive power at the central portion and a negative power at the peripheral portion; and a fifth lens having a strong negative power, wherein the first to fifth lenses are sequentially arranged along an optical axis toward a cathode ray tube from a screen.

To correct the chromatic aberration, it is desired that distance between the fourth lens and the fifth lens be adjustable. To correct the focal point, it is desired that distance between the first lens and the second lens be adjustable. When the distance between the second lens and the third lens is smaller than that between the third lens and the fourth lens, the distortion aberration becomes relatively small.

BRIEF DESCRIPTION THE DRAWINGS

FIG. 1 is a schematical illustration of a group of projection lenses for a rear projection television according to the present invention;

FIGS. 2A through 2E are graphical illustrations each representing an aberration according to one embodiment of the present invention.

DETAILED DESCRIPTION OF THE PREFERRED EMBODIMENT

Figure 3:
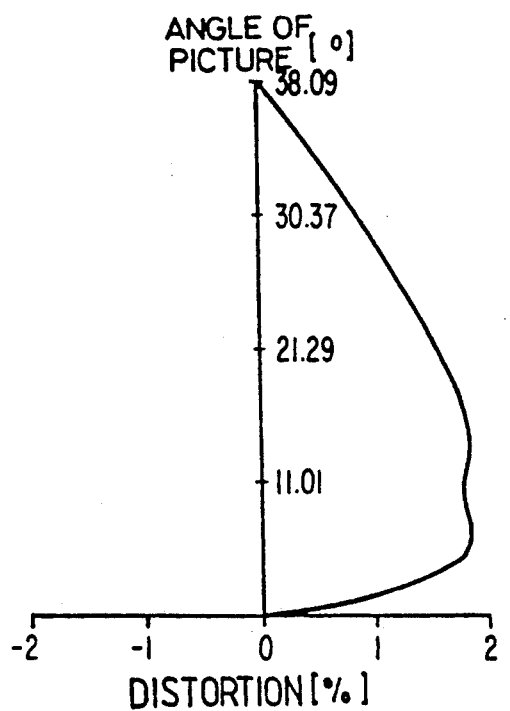
FIGS. 3 and 4 are graphical illustrations representing a distortion aberration and an oblique astigmatism respectively.

A preferred embodiment of the present invention will be described below in more detail with reference to the accompanying drawings.

In FIG. 1, which shows an arrangement of a group of projection lenses for a rear projection television according to the present invention, a fifth lens L5 having a strong negative power is attached to a front glass of a fluorescent surface 10 of the CRT with a cooling means 12 interposed therebetween. After the fifth lens L5, a fourth lens L4, a third lens L3, a second lens L2 and a first lens L1 are arranged in the stated order along the optical axis 13 toward the screen (not shown). The fourth lens L4 has a positive power at the central portion and a negative power at the peripheral portion. The third lens L3 has substantially no power at the central portion with a positive power gradually increasing toward the periphery of the lens. The second lens L2 has a strong positive power and the first lens L1 has substantially no power at the central portion thereof with a negative power gradually increasing toward the peripheral portion of the lens.

The above first, third, fourth and fifth lenses L1, L3, L4 and L5 are formed so that at least one surface thereof is aspherical and are desirably manufactured by plastic injection molding. The second lens L2 having the strong positive power maintains most of the power of the projection lens apparatus. Accordingly, it is desired that second lens L2 be made of a spherical glass lens having a large refractive index.

Since first lens L1 has almost no power at the central portion and a strong negative power approaching the peripheral portion thereof, it functions to correct a spherical aberration and a coma aberration and to enhance the peripheral light quantity. Since the third lens L3 has almost no power at the central portion and a strong positive power approaching the peripheral portion thereof, it functions to correct the spherical aberration in a complementary manner with first lens L1 and to enhance the peripheral light quantity.

Also, the axial location of the third lens L3 is adjustable. Accordingly, distance d6 between third lens L3 and fourth lens L4, and distance d4 between third lens L3 and second lens L2 may be changed, thereby allowing the distortion aberration to be corrected. In the present embodiment, when the distances d6 and d4 approximately satisfy the equation d6=2·d4, the distortion aberration is minimized. Thus, without relying on the convergence means of the CRT, minimum distortion aberration can be obtained.

The fourth lens L4 having the positive power at the central portion and the negative power at the peripheral portion functions to correct the coma aberration and an oblique astigmatism. The fifth lens L5 corrects a curvature of field with the strong negative power.

By combining the above lenses, spherical aberration, coma aberration, distortion aberration curvature of field, and the like can be properly corrected.

On the other hand, due to the heat generated by the CRT and the screen, the central portion of plastic lenses close to the CRT tend to be heated while the peripheral portion of the lenses close to the screen tend to be heated. Accordingly, the image formation may be degraded. To compensate for this, in the projection lens according to the present invention, the first lens L1 closest to the screen has a thicker peripheral portion than the central portion thereof, while third and fourth lenses L3 and L4 have thicker central portions. Accordingly, even if a variation of the shape of these lenses occurs due to variation of the temperature, the variations are cancelled because of the above different shapes of the plastic lenses, thereby correspondingly cancelling and preventing degradation of the image formation.

Also, in correcting the chromatic aberration, a conventional projection lens is designed to correct the chromatic aberration with respect to only the green light, and adopts a method of correcting the chromatic aberration by adjusting the distance between the CRT and the lens closest to the CRT with respect to the blue and red lights. However, even if the chromatic aberration is corrected by adjusting the distance, the image formation at the peripheral portion on the screen will be degraded. Therefore, in one preferred embodiment of the present invention, the chromatic aberration is corrected by adjusting distance d8 between fourth lens L4 and, fifth lens L5. At the same time, in the present embodiment, distance d2 between first lens L1 and second lens L2 can be adjusted, to thereby improve the quality of picture at the peripheral portion on the screen.

EXAMPLE

The projection lens apparatus having the above constitution was constructed as presented in Table 1. The effective diagonal distance of the CRT was 5.1 inches, the diagonal distance of the screen was 43 inches and the projection distance was 660 mm. In Table 1, S1, S2, S3 ..., S11 denote the respective lens surfaces as shown in FIG. 1, and the curvature radius and thickness or distance are represented in unit of millimeter (mm). The thickness or distance represents the thickness or distance between a lens surface and the next lens surface, as shown as d1, d2, ..., d11 in FIG. 1. The effective focus distance by the above lens group is 63.389 mm, and the aperture ratio is 1 to 1.

TABLE 1

| | Curvature radius | Thickness or Distance | Refractive Index | Dispersion Rate |
|---|---|---|---|---|
| Object | ∞ | 660.0 | | |
| S1 | 63.354 | 6.17 | 1.492 | 57.1 |
| (d1) | | | | |
| S2 | 67.213 | 22.54 | | |
| (d2) | | | | |
| S3 | 95.945 | 19.04 | 1.648 | 33.9 |
| (d3) | | | | |
| S4 | −136.707 | 5.53 | | |
| (d4) | | | | |
| S5 | 390.115 | 7.20 | 1.492 | 57.1 |
| (d5) | | | | |
| S6 | −206.330 | 11.93 | | |
| (d6) | | | | |
| S7 | 2091.073 | 6.72 | 1.492 | 57.1 |
| (d7) | | | | |
| S8 | −144.625 | 32.19 | | |
| (d8) | | | | |
| S9 | −46.505 | 3.06 | 1.492 | 57.1 |
| (d9) | | | | |
| S10 | −49.608 | 10.0 | 1.458 | 50.0 |
| (d10) | | | | |
| S11 | ∞ | 13.1 | 1.551 | 50.0 |
| (d11) | | | | |
| image | −350.0 | | | |

Second lens L2, made of the lens surfaces S3 and S4, is a spherical glass lens and the other lenses are aspherical plastic lenses. The aspherical curve of the aspherical lens surface is determined by the following aspherical equation Q, and the conoid constant K and aspherical coefficient of the respective surfaces are represented as in Table 2.

$$Z(H) = \frac{H^2/R}{1 + [1 - (K + 1)H^2]/R^2} + AH^4 + BH^6 + CH^8 + DH^{10} \quad (Q)$$

In the above equation, Z represents a unit length (mm) in the direction of the optical axis, H is expressed by following equation $$H = \sqrt{a^2 + y^2}$$

as a lens height, R represents the curvature radius as provided in Table 1, K the conoid constant, and A, B, C and D are aspherical coefficients for determining the shapes of the lens surfaces.

TABLE 2

| S1 | S2 | S5 | S6 |
|---|---|---|---|
| K = −11.170271 | K = −5.643738 | K = +105.5565 | K = −25613620 |
| A = .276949E-05 | A = .164792E-05 | A = −.128702E-06 | A = −.861473E-06 |
| B = −.394984E-8 | B = −.151475E-08 | B = −.205282E-09 | B = −.614963E-09 |
| C = .154798E-11 | C = .482984E-12 | C = .107458E-12 | C = .566922E-12 |
| D = .202033E-15 | D = .892371E-16 | D = .154617E-15 | D = .156834E-15 |
| S7 | S8 | S9 | S10 |
| K = 3993.825 | K = 1.961949 | K = −.271846 | K = .259053 |
| A = .801574E-07 | A = .230138E-05 | A = −.365217E-05 | A = −.234766E-05 |
| B = .124378E-08 | B = .596149E-09 | B = .558868E-08 | B = .260000E-08 |
| C = .201805E-11 | C = .336646E-11 | C = −.421170E-11 | C = −.400000E-12 |
| D = −.146213E-14 | D = −.173575E-14 | D = .124797E-14 | D = .800000E-16 |

Figure 4:
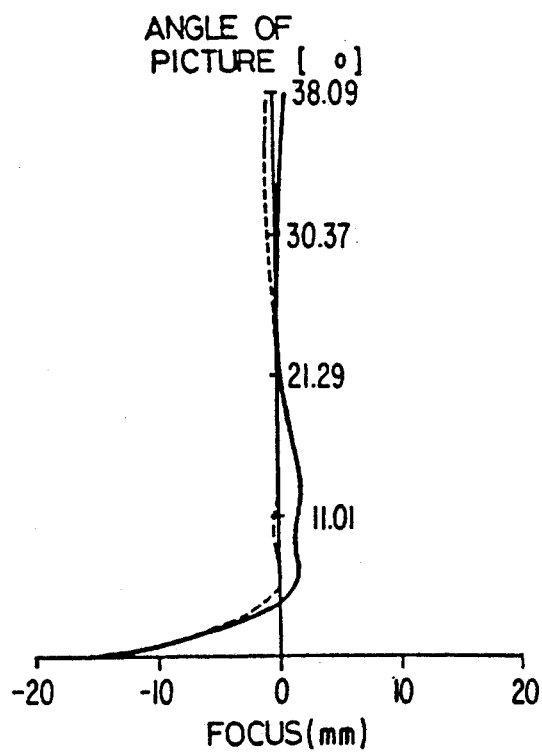

FIGS. 2A through 2E are graphical views of the aberration according to one embodiment of the present invention. In FIGS. 2A–2E, the values of aberration (vertical axis) at the tangential surface and the spherical surface with respect to the respective relative field height (picture angle) are expressed in unit of millimeter (mm). It can be seen that the aberration is adjusted to have a very low value of not more than 0.20 mm. FIG. 3 shows the distortion aberration in which the vertical axis represents the angle of picture, and the horizontal axis the degree of distortion. The maximum distortion is not more than 2%, which is remarkably smaller than distortion associated with a conventional arrangement which is in the range of 6 to 7%. , FIG. 4 shows the oblique astigmatism of the present embodiment in which the vertical axis represents the angle of picture, and the horizontal axis the amount of the focus discrepancy. In FIG. 4, the solid line and the dotted line represent the discrepancies of the vertical direction and the horizontal direction, respectively. Since these solid and dotted curves substantially overlap the focal line, it can be seen that the image formation is excellent and the oblique astigmatism is properly corrected.

As described above, the projection lens apparatus for the rear projection television according to the present invention is composed of a plurality of lenses having a variety functions. Accordingly, the projection distance and the size of the lens are reduced, thereby reducing the size of the system. Also, the various aberrations generated by the projection lenses are effectively corrected, to thereby improve performance of the image formation and the peripheral light quantity.

What is claimed is:

1. A projection lens apparatus for a rear projection television, said projection lens apparatus comprising:
    a first lens in which a negative power of the lens gradually increases from a central portion thereof, having substantially no power, to a peripheral portion thereof;
    a second lens having a strong positive power;
    a third lens in which a positive power of the third lens gradually increases from a central portion thereof, having substantially no power, to a peripheral portion thereof;
    a fourth lens having a positive power at a central portion thereof and a negative power at a peripheral portion thereof; and
    a fifth lens having a strong negative power, wherein the first to fifth lenses are sequentially arranged in the stated order along an optical axis extending from a screen to a cathode ray tube.

2. The projection lens apparatus for a rear projection television as claimed in claim 1, wherein a distance between said fourth lens and said fifth lens is adjustable.

3. The projection lens apparatus for a rear projection television as claimed in claim 1, wherein a distance between said first lens and said second lens is adjustable.

4. The projection lens apparatus for a rear projection television as claimed in claim 2, wherein a distance between said first lens and said second lens is adjustable.

5. The projection lens apparatus for a rear projection television as claimed in claim 1, wherein a distance between said second lens and said third lens is smaller than a distance between said third lens and said fourth lens.

6. The projection lens apparatus for a rear projection television as claimed in claim 4, wherein a distance between said second lens and said third lens is approximately one half of a distance between said third lens and said fourth lens.

7. The projection lens apparatus for a rear projection television as claimed in claim 1, wherein said first, third, fourth and fifth lenses are plastic lenses, and said second lens is a spherical glass lens.

8. The projection lens apparatus for a rear projection television as claimed in claim 1, wherein a distance between said third lens and said fourth lens is adjustable.

9. The projection lens apparatus for a rear projection television as claimed in claim 1, wherein a distance between said second lens and said third lens is adjustable.

10. The projection lens apparatus for a rear projection television as claimed in claim 1, wherein said fifth lens is attached to a front of said cathode ray tube with a cooling means interposed therebetween.

11. The projection lens apparatus for a rear projection television as claimed in claim 1, wherein a peripheral portion of said first lens is thicker than a central portion thereof.

12. The projection lens apparatus for a rear projection television as claimed in claim 1, wherein respective central portions of said third and fourth lenses are thicker than respective peripheral portions thereof.

* * * * *